US008799392B2

(12) United States Patent
Mehyar et al.

(10) Patent No.: US 8,799,392 B2
(45) Date of Patent: Aug. 5, 2014

(54) INTERNET PROTOCOL FOR DISTRIBUTED AVERAGING

(75) Inventors: Mortada Mehyar, Pasadena, CA (US); Demetri Spanos, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 2264 days.

(21) Appl. No.: 11/210,720

(22) Filed: Aug. 24, 2005

(65) Prior Publication Data
US 2006/0045025 A1    Mar. 2, 2006

Related U.S. Application Data

(60) Provisional application No. 60/604,126, filed on Aug. 24, 2004.

(51) Int. Cl.
*G06F 15/16* (2006.01)
*H04L 12/56* (2006.01)
*H04W 40/24* (2009.01)

(52) U.S. Cl.
CPC .................................... *H04L 45/02* (2013.01); *H04W 40/24* (2013.01)
USPC ............................. 709/207; 709/217; 709/218

(58) Field of Classification Search
CPC .. H04L 45/02; H04L 29/08072; H04W 40/24
USPC ......................................... 709/201, 206, 207
See application file for complete search history.

(56) References Cited

U.S. PATENT DOCUMENTS

| | | | | |
|---|---|---|---|---|
| 6,529,953 B1 * | 3/2003 | Van Renesse | ................. | 709/223 |
| 6,629,268 B1 * | 9/2003 | Arimilli et al. | ................. | 714/42 |
| 6,880,097 B1 * | 4/2005 | Frouin et al. | ................. | 713/400 |

OTHER PUBLICATIONS

"Gossip-Based Computation of Aggregate Information" David Kempe, Alin Dobra, and Johannes Gehrke. Proceedings of the 44th Annual IEEE Symposium on Foundations of Computer Science (FOCS'03). IEEE Computer society. 2003.*
A Randomized Algorithm for Distributed Consensus, Author: Akhil Kumar, Published: Oct. 1998 http://ieeexplore.ieee.org/xpl/articleDetails.jsp?reload=true&arnumber=740511.*
Impossibility of Distributed Consensus with One Faulty Process, Author: Micheal J. Fisher et al., Journal of the ACM (JACM) JACM Homepage archive vol. 32 Issue 2, Apr. 1985, pp. 374-382.*

* cited by examiner

*Primary Examiner* — Noel Beharry
(74) *Attorney, Agent, or Firm* — Lyon & Harr, LLP; Richard T. Lyon

(57) ABSTRACT

The scheme of the invention addresses practical concerns that arise in actual implementations on packet-switched communication networks such as the Internet. The system includes several implementable algorithms that are robust to asynchronism and dynamic topology changes. The algorithms are distributed and do not require any global coordination. In addition, they can be proven to converge under very general asynchronous timing assumptions. The system of the invention provides a distributed protocol for averaging the values of several real numbers associated with members of a peer-to-peer network. The system implements a pair-wise communication protocol between nodes with each node having a state value that is incrementally driven to the average of the distributed values. At each node, received state values from neighboring nodes, along with local step-wise values, are used to update the local state value. Embodiments include schemes to allow ordered processing in an asynchronous environment and to prevent message deadlock.

11 Claims, 5 Drawing Sheets

INTERNET PROTOCOL FOR DISTRIBUTED AVERAGING

The present application claims the benefit of priority from U.S. Provisional Patent Application No. 60/604,126, entitled "Protocol For Distributed Averaging", filed on Aug. 24, 2004, which is herein incorporated by reference in its entirety.

BACKGROUND OF THE INVENTION

1. Field of the Invention

This invention relates to the field of an internet protocol for distributed averaging.

2. Background Art

Distributed averaging problems are problems in which several spatially separated processes (or agents) must reach some common output value (a classical example is the Byzantine generals problem). There have been attempts to calculate averages on asynchronous distributed networks. One technique is to flood the network with all values. This approach results in large messaging complexity. Another is to use structured message propagation over a known overlay network, which is not always available. Both approaches require a global exchange of information, adding to complexity.

SUMMARY OF THE INVENTION

The scheme of the invention addresses practical concerns that arise in actual implementations on packet-switched communication networks such as the Internet. The system includes several implementable algorithms that are robust to asynchronism and dynamic topology changes. The algorithms are distributed and do not require any global coordination. In addition, they can be proven to converge under very general asynchronous timing assumptions. The system of the invention provides a distributed protocol for averaging the values of several real numbers associated with members of a peer-to-peer network. The system implements a pair-wise communication protocol between nodes with each node having a state value that is incrementally driven to the average of the distributed values. At each node, received state values from neighboring nodes, along with local step-wise values, are used to update the local state value. Embodiments include schemes to allow ordered processing in an asynchronous environment and to prevent message deadlock.

DETAILED DESCRIPTION OF THE PREFERRED EMBODIMENTS

Figure 1:
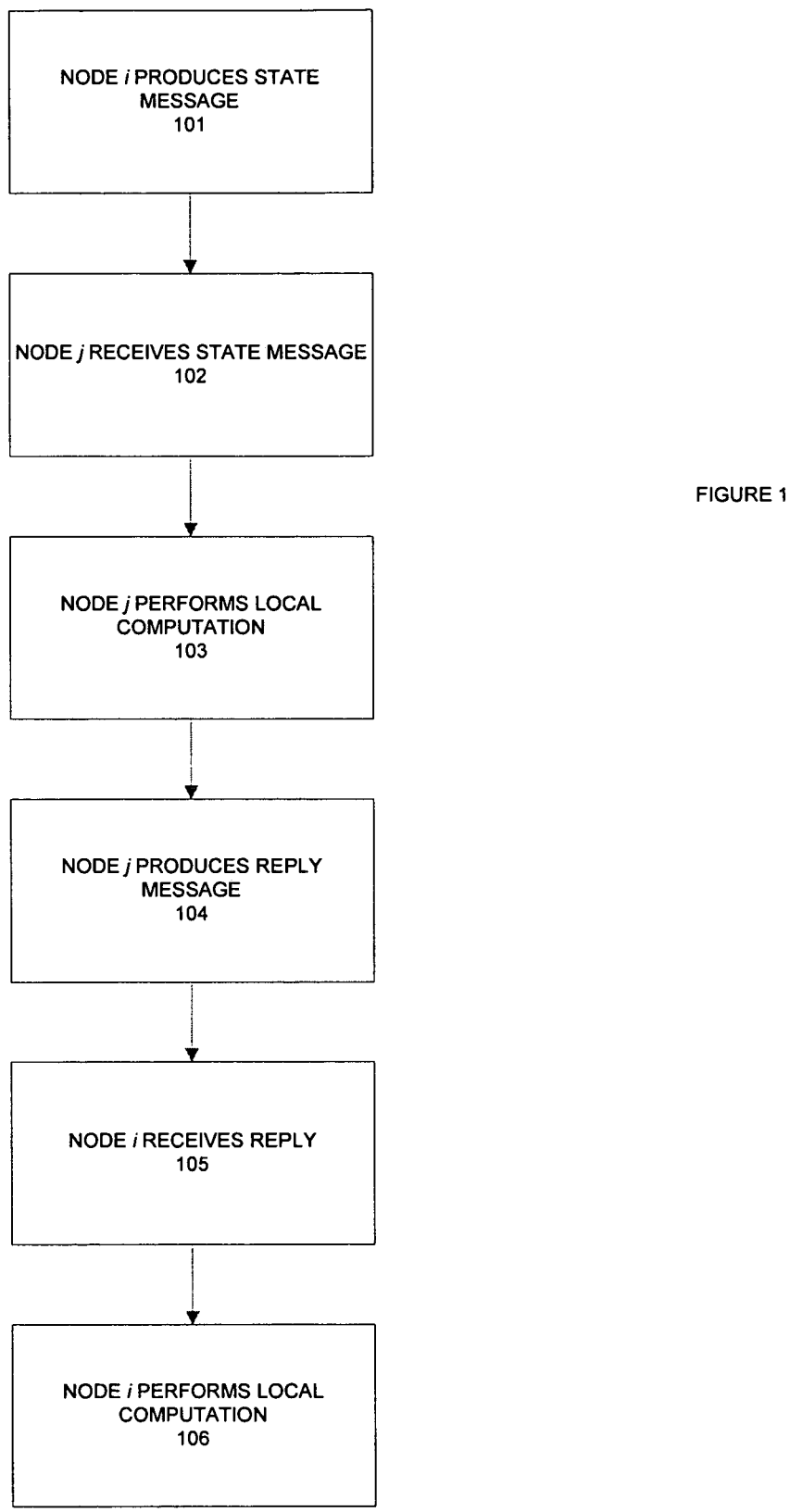
FIG. 1 is a flow diagram illustrating the update procedure between two nodes on a network.

A protocol for distributed averaging is described. In the following description, numerous specific details are set forth in order to provide a more detailed description of the invention. In other instances, well known features have not been described in detail so as not to obscure the invention. It is understood to one of skill in the art, that the invention may be practiced without these specific details.

The prior art has considered averaging problems, for example Olfati-Saber and Murray in "Consensus Problems in Networks of Agents with Switching Topology and Time-Delays", *IEEE Trans. on Automatic Control*, VOL. 49, NO. 9, September 2004. This work focuses on a special matrix, the Laplacian matrix, associated with an undirected graph G. Note that the adjacency matrix A, associated with a graph, is a matrix with a 1 in the i,j entry if and only if the graph includes the edge ij, and is zero elsewhere. The Laplacian is defined in terms of the adjacency matrix as follows:

$$D_{ii} = \sum_j A_{ij}$$

$$D_{ij} = 0 \text{ if } i \neq j$$

$$L = D - A$$

This is known as the Laplacian matrix because it represents a discrete version of the classical Laplacian differential operator $\nabla^2$ arising in diffusion processes. The prior art of Olfati-Saber and Murray proposes the following differential equation as a mechanism for averaging:

$$\dot{x} = -Lx \quad (1)$$

First, note that this is a distributed "algorithm", in the sense that each member of the network need only communicate with its neighbors. Second, note that $$\sum_j L_{ij} = 0$$

for all i, and so for any "consensus vector" $x_c$, i.e. a vector in which all components are equal, $Lx_c=0$. It can in fact be shown that consensus is the only equilibrium of the above differential equation, provided the graph G is connected. Finally, note that by this same property, we have the following conservation property:

$$\frac{d}{dt}\sum_i x_i 0$$

These facts suffice to explain the Laplacian algorithm (1); the differential equation must converge to a consensus, and the sum of the initial states is conserved, so each component (in equilibrium) must equal the average of the initial values.

Other authors have also considered similar problems. Recently, L. Xiao and S. Boyd, "Fast Linear Interactions for Distributed Averaging", *Proceedings of The Conference on Decision and Control*, 2003 examined the possibility of topology optimization for maximizing the convergence rate of the algorithm. The work in A. Fax and R. M. Murray, "*Graph Laplacians and Stabilization of Vehicle Formations*", The 15th IFAC World Congress 2002 considered a very similar algorithm for distributed center-of-mass estimation in control of vehicle formations.

Unfortunately, all of these results share the drawback of not being directly implementable on a real network. Clearly, a differential equation is not implementable, but even the associated discrete-time system, $$x(t+1)=x(t)-\lambda Lx(t)$$

(here γ is a stepsize parameter) is problematic. At least three problems exist:

1) Synchronization: Any implementation must operate asynchronously, but asynchronous operation destroys the conservation property that enables the algorithm.

2) Global Step-size: Each node must use exactly the same step-size to obtain the conservation property, which is impractical and undesirable for a true peer-to-peer implementation.

3) Global Topology Dependence: The allowable step-size depends on the eigenvalues of L, which in turn depend on global properties of the network. Not only is this information not available locally, but the topology of a peer-to-peer network can change dramatically with time.

All of these are serious networking concerns that cannot be avoided in any real-world implementation. The first concern, synchronization, is particularly important, since even fairly general asynchronous models do not provide a mechanism for preserving conservation properties in an asynchronous system. Some related work has been done in this area by the numerical analysis and dynamical systems communities, as in, but this work does not directly apply to this problem.

Problem and Notation

For purposes of this description, consider a connected network, modeled as a connected undirected graph G=(V, E). We refer to elements of V as nodes, and elements of E as links. The nodes are labeled i=1, 2, . . . , n, and a link between nodes i and j is denoted by ij.

Each node has some associated numerical value, say $z_i$, which we wish to average over the network. This could be, for example, a measure of process load, and the averaging calculation might be part of a load-balancing scheme. We will also refer to the vector z whose ith component is $z_i$.

Each node on the network maintains a local variable $x_i$. When we wish to show the time dependence of these variables, we use the notation $x_i(t)$. Intuitively each node's local variable is its current estimate of the average value of the z; terms. We refer to this variable as the state of the node i, and we initialize the states at the values $z_i$. We use the notation x to denote the vector whose components are the $x_i$ terms.

With this notation in hand, we remark that the Laplacian algorithm (1) can be viewed as a continuous-time gradient search for the following optimization problem:

$$\min \frac{1}{2} x^T L x$$
$$x \in R$$
$$\text{s.t.} \sum_1 x_i = \sum_1 z_i$$

Expanding the cost function, we find it to be $$x^T L x = \sum_{ij \in E} (x_i - x_j)^2 \quad (2)$$

i.e. the sum of all the discrepancies across links squared.

Overview of Message Passing

The fundamental "unit" of communication in an embodiment of the invention is a pair-wise update. Consider two (distinguishable) types of messages, identified in a header. We refer to these two types as state messages and reply messages. The update procedure is illustrated in FIG. 1 and occurs as follows:

MP1: Node i produces a state message and places it on an outgoing link to some other node, say j (step 101).

MP2: At some later time, node j receives this message (step 102).

MP3: Node j then performs a local computation involving both its local state, and the message received from i (step 103).

MP4: Node j produces a reply message and puts it on the return link from j to i (step 104).

MP5: At some later time, node i receives j's reply (step 105).

MP6: Node i then performs a local computation in response to j's reply message, and the procedure terminates (step 106).

Note that this is distinct from typical models for asynchronous numerical computations. Specifically, the send-and-reply convention allows us to achieve a certain kind of virtual synchronization; although the updates are not synchronized in time, they are based on a common pair of numerical values, stored in the state and reply messages.

We will also propose a certain additional behavior in message passing, which we call blocking. Generally speaking, this behavior ensures that each node is involved in at most one update at any particular time. This requires special handling of state messages that arrive at a node that itself is expecting a reply. This blocking behavior can be implemented in a number of ways. In one embodiment, we choose to have "blocking" nodes ignore any new state messages, and allow senders of state messages to timeout and retransmit if replies do not arrive.

Figure 2:
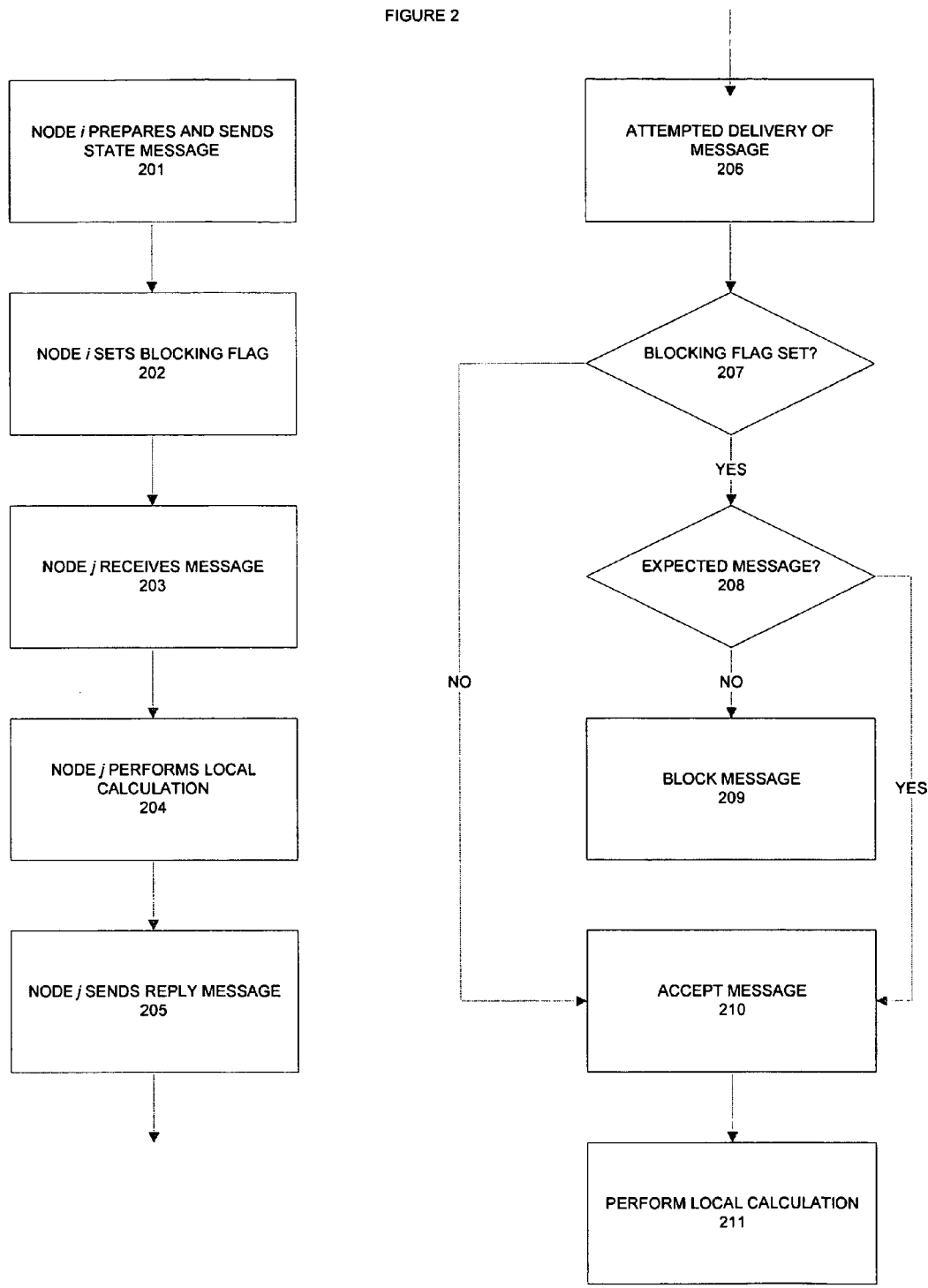
FIG. 2 is a flow diagram illustrating pair wise messaging with blocking.

FIG. 2 is a flow diagram illustrating the pair-wise message passing with blocking in an embodiment of the invention. At step 201 node i prepares a message and sends it on a communication link to node j. At step 202 node i sets its blocking flags putting it into a blocking state while awaiting the reply message from node j. At step 203 node j receives the message. At step 204 node j performs a local computation involving its local state and the received message. At step 205 node j prepares a reply message and sends it on a communication link to node i.

Steps 206-211 illustrate the operation of a sending node whenever it receives a message in the embodiment that uses blocking. At step 206 node i receives a message for attempted delivery from the network. At decision block 207 node i determines if its blocking flag is set. If not, then the message is accepted at step 210. If the blocking flag is set, at decision block 208 node i determines if this is an expected reply message. If not, the message is blocked at step 209. If the message is expected at decision block 208, the message is accepted at step 210. After receipt of the message, node i performs a local operation at step 211.

Algorithm A1

At each node i there is a local step-size parameter $\gamma_i, 0 < \gamma_i < 1$ upon which the node s computation is based. These do not need to be coordinated, and convergence of the algorithm will be guaranteed solely by the interval bound. The step-size parameter may be chosen locally and its value does not need to be set or controlled or even known on a system wide basis.

As noted above, the basic interaction in one embodiment is an update on a link. Such an update is initiated whenever a node sends out a state message containing the current value of its state. For the moment, we do not specify, the timing or triggering for this event; we merely make the following assumption:

Eventual Update Assumption: for any link ij and any time t, there exists a later time $t_j > t$ such that there is an update on link ij at time $t_j$.

Figure 3:
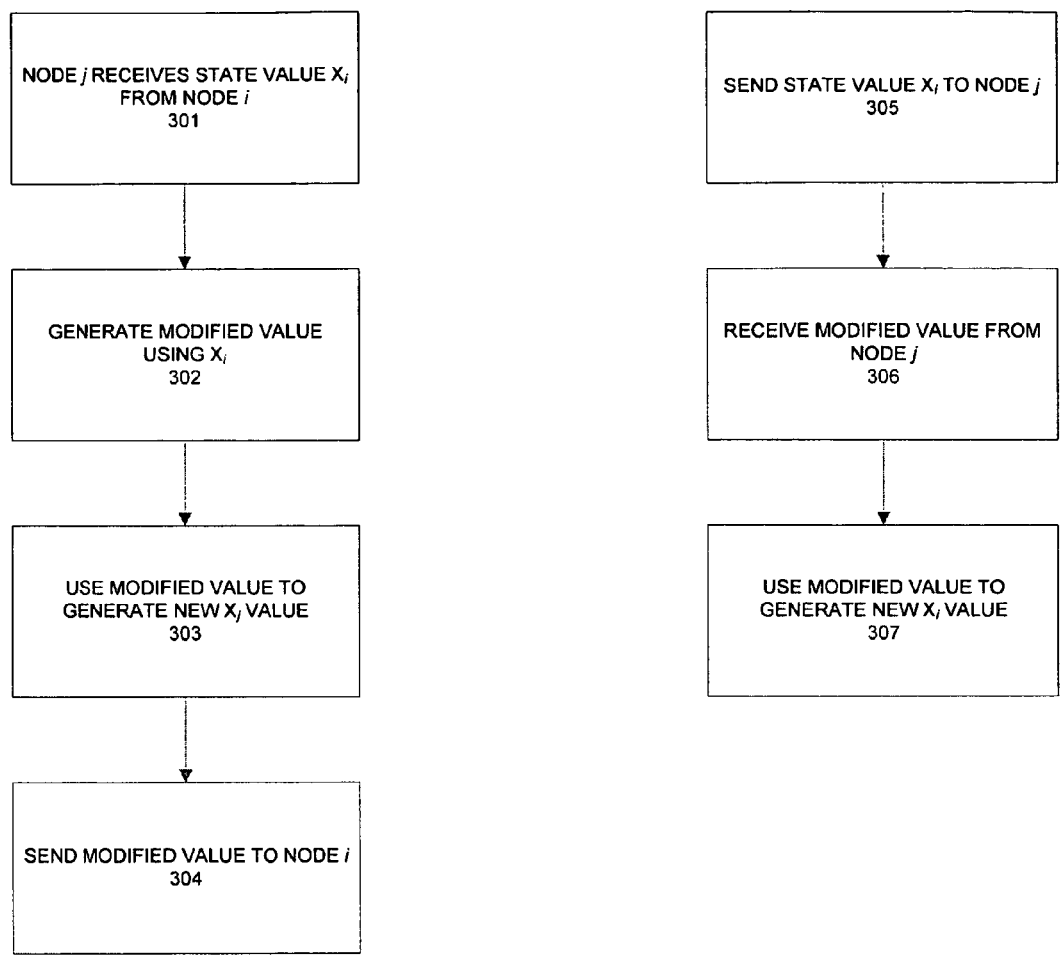
FIG. 3 is a flow diagram illustrating an embodiment of the invention.

Once an update has been initiated, the remainder of the pair-wise interaction is specified as follows and illustrated in FIG. 3:

PW1: Node j receives a state message at step 301 from node i. If its blocking flag is on, it ignores the message.

PW2: Otherwise, it uses the state value $x_i$ from node i to generate a modified value $\gamma_j(x_i-x_j)$ at step 302. At step 303 it updates its own state value using the modified value by implementing $x_j \leftarrow x_j + \gamma_j(x_i-x_j)$.

PW3: Then, it generates a reply message containing the modified value $\gamma_j(x_i-x_j)$, and at step 304 sends it to i.

PW4: Node i has sent a state message at step 305. At step 306 it receives the reply message that includes the modified value $\gamma_j(x_i-x_j)$. At step 307 node i adjusts its own state value $x_i$ by implementing $x_i \leftarrow x_i - \gamma_j(x_i-x_j)$.

Notice that node i does not need to know the actual value of $\gamma_j$, all it needs to know is the modified value (representing how much change node j has made), which is contained in the reply message. Note also that in this embodiment, a receiving node adjusts its state value by adding the modified value and the original sending node adjusts its state value by subtracting the received modified value. It should be noted that other schemes may be implemented in other embodiments without departing from the scope and spirit of the invention.

The send-and-reply mechanism of this embodiment provides conservation. Note that after an update, node i has compensated the action of node j. We thus have a certain special kind of conservation, as follows:

Under the action of algorithm A1, the sum of all the node states, and any reply messages currently on the network is conserved and equal to $$\sum_i z_i.$$

This in fact is independent of the blocking behaviour (blocking generates an additional property, which is useful for analysis).

With blocking, although updates at i and j occur at different times, it is equivalent to a synchronous update and then an inactivity period for node i equal to the time it takes for a reply message to propagate from j to i.

Thus, aside from the timing details of when updates are initiated, it is sufficient to consider synchronized updates, and we will do so for the purposes of the analysis to follow. It remains to be shown that any algorithm satisfying the Eventual Update Assumption and implementing the interaction (with blocking) described above must converge to a consensus.

Convergence of Algorithm A1

Our proof will make use of the following "potential" function:

$$P(t) = \sum_{\forall (i,j)} |x_i(t) - x_j(t)| \quad (3)$$

where the sum is over all $$\frac{n(n-1)}{2}$$

possible pairs (i,j). For instance, the potential function for the network in FIG. 4 (an example network consisting of four nodes in a "star" topology) is $$|x_1-x_2|+|x_1-x_3|+|x_1-x_4|+|x_2-x_3|+|x_2-x_4|+|x_3-x_4|$$

Lemma 1: If nodes (i,j) update at time t while node i being the sender, then at the next time unit t+1

$$P(t+1) \leq P(t) - 2\min\{\gamma_j, 1-\gamma_j\}|x_i(t)-x_j(t)| \quad (4)$$

Proof: In summary at time t+1

$$x_i(t+1) = (1-\gamma_j)x_i(t) + \gamma_j x_j(t) \quad (5)$$

$$x_j(t+1) = \gamma_j x_i(t) + (1-\gamma_j)x_j(t) \quad (6)$$

$$x_k(t+1) = x_k(t), \forall k \neq i,j \quad (7)$$

Therefore besides the term $|x_i-x_j|$, n−2 terms of the form $|x_k-x_i|$ and n−2 terms of the form $|x_j-x_k|$, $k \neq i,j$ in the potential function P(t), are affected by the update. First of all we have $$|x_i(t+1)-x_j(t+1)| = |(1-2\gamma_j)||x_i(t)-x_j(t)| \quad (8)$$

Now consider the sum of two of the affected terms $|x_k(t)-x_i(t)|+|x_k(t)-x_j(t)|$. If we look at the relative positions of $x_i(t)$, $x_j(t)$, and $x_k(t)$ on the real line, then either $x_k$ is on the same side of $x_i$ and $x_j$ or it is in between them. Therefore as long as $0<\gamma_j<1$, it is clear geometrically in both cases we have $$|x_k(t+1)-x_i(t+1)|+|x_k(t+1)-x_j(t+1)| \leq |x_k(t)-x_i(t)|+|x_k(t)-x_j(t)|$$

Therefore $$P(t+1)-P(t) \leq |x_i(t+1)-x_j(t+1)|-|x_i(t)-x_j(t)| \leq -2\min\{\gamma_j,1-\gamma_j\}|x_i(t)-x_j(t)|$$

The quantity $\min\{\gamma_j, 1-\gamma_j\}$ can be thought of as an effective step-size for node j since a step-size of 0.6, say, is equivalent to 0.4 in terms of reducing the relative difference in absolute value.

Lemma 2: At any time t, there exists a later time t'>t such that at time t' there has been at least one update on every link since time t. Furthermore, $$P(t') \leq \left(1 - \frac{8\gamma^*}{n^2}\right)P(t) \quad (9)$$

where $\gamma^* = \min_i \min\{\gamma_i, 1-\gamma_i\}$.

Proof: Without loss of generality, suppose at time t we have $x_1(t) \leq x_2(t) \leq \ldots \leq x_n(t)$. We call the n−1 terms of the form $|x_i(t)-x_{i+1}(t)|$, $i \in \{1, 2, \ldots, n-1\}$, segments of the network at time t. By expanding every term in the potential function as a sum of segments, we see that the potential function can be written as a linear combination of all the segments:

$$P(t) = \sum_{i=1}^{n-1}(n-i)i|x_i(t)-x_{i+1}(t)| \quad (10)$$

We say that a segment $|x_i(t)-x_{i+1}(t)|$ at time t is claimed at time t'>t, if there is an update on a link of nodes r and s such that the interval $[x_s(t'),x_r(t')]$ (on the real line) contains the interval $[x_i(t),x_j(t)]$. For instance, for the network in FIG. 4, the segments are $|x_3-x_2|$, $|x_2-x_1|$, and $|x_1-x_4|$, as shown in FIG. 5. FIG. 5 illustrates the four node network of FIG. 4 embedded on the real line according to node value $x_i$. The solid lines between the nodes represent segments or intervals on the real line separating two adjacent values. The dotted curves indicate the communication topology from FIG. 4. See that an update on the link between node 1 and node 3 will claim segments $[x_3,x_2]$ and $[x_2,x_1]$.

By using the Eventual Update Assumption on each link, the existence of t' is guaranteed. From Lemma 1 it is clear that whenever a segment is claimed, it contributes a reduction in the potential function proportional to its size (see (4)). Referring to FIG. 5, it can be seen that an update that does not claim a segment can only leave the segment unchanged or make it larger. Therefore no matter when a segment is claimed after time t, it will contribute at least $2\gamma^*|x_{i=1}(t)-x_{i+1}(t)|$ reduction in the potential function.

Now connectedness of the network implies that for each segment there is at least one link such that an update on that link will claim the segment. Therefore by time t' all segments will be claimed. Thus the total reduction in the potential function between t and t' is at least $$2\gamma^* \sum_{i=1}^{n-1} |x_i(t) - x_{i+1}(t)|.$$

It follows that $$P(t') \leq P(t) - 2\gamma^* \sum_{i=1}^{n-1} |x_i(t) - x_{i+1}(t)| =$$

$$\left(1 - \frac{\sum_{i=1}^{n-1} 2\gamma^* |x_i(t) - x_{i+1}(t)|}{\sum_{i=1}^{n-1} (n-i)i|x_i(t) - x_{i+1}(t)|}\right) P(t) \leq \left(1 - \frac{8\gamma^*}{n^2}\right) P(t)$$

Where in the last inequality we use the fact that $n(n-i) \leq n^2/4$.

With the above lemmas, we are ready to show convergence:

Theorem 1:

$$\lim_{t \to \infty} x_i(t) = \frac{1}{n} \sum_{i=1}^{n} x_i(t),$$

i.e. the consensus of initial conditions of the network, $\forall i \in \{1, 2, \ldots, n\}$.

Proof Repeatedly applying Lemma 2, we see that $$\lim_{t \to \infty} P(t) = 0 \tag{11}$$

Therefore $$\lim_{t \to \infty} |x_i(t) - x_j(t)| = 0, \forall i, j \tag{12}$$

now by the conservation property $$\sum_{i=1}^{n} x_i(t) = \sum_{i=1}^{n} z_i(t), \forall t \tag{13}$$

we see that $$\lim_{t \to \infty} x_i(t) = \frac{1}{n} \sum_{i=1}^{n} z_i(t) \tag{14}$$

Implementation and Deadlock Avoidance

Any implementation (protocol) that satisfies the Eventual Update Assumption is within the scope of the convergence proof. However we have not, as yet indicated a specific mechanism for the update triggering. Without a properly designed procedure for initiating communication, the system can drive itself into a deadlock due to the blocking condition.

In an embodiment described below, we use a round-robin initiation pattern, which provably prevents deadlock and satisfies the updating assumption. This is for purposes of example only, and other schemes may be used without departing from the scope and spirit of the invention.

Our implementation is based on some unique identifiers (UID), e.g. IP address. Based on these UIDs, we impose an additional directed graph H=(V, F), in which an edge points from i to j if and only if node j has a higher UID than node i. This graph has two important properties:

H1: H has at least one root, i.e. a node with no inbound edges.

H2: H is acyclic.

Figure 4:
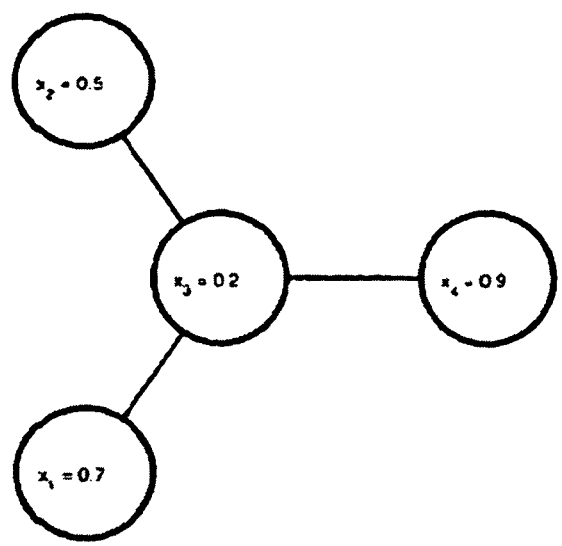
FIG. 4 is an example network topology in an embodiment of the invention.
Figure 5:
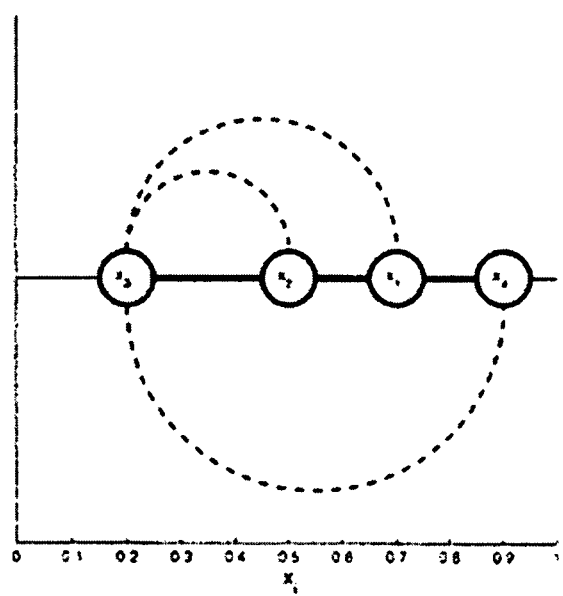
FIG. 5 is an embedded view of the network topology of FIG. 4.

This graph is illustrated for our four-node example network in FIG. 4.

Figure 6:
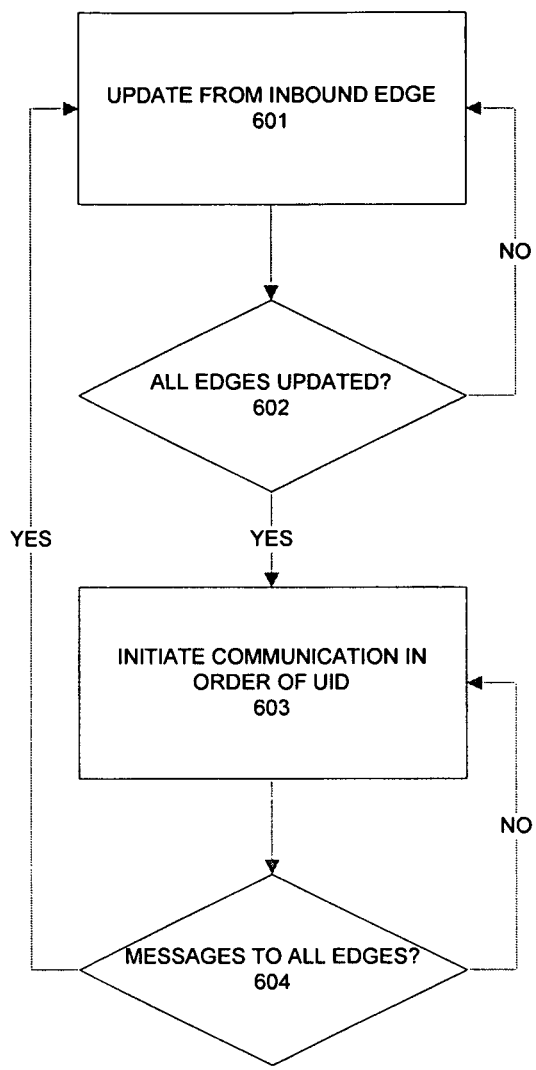
FIG. 6 is a flow diagram illustrating the round robin scheme of an embodiment of the invention.

Our proposed initiation scheme is illustrated in FIG. 6 and described as follows:

RR1: A node will wait to observe updates from all of its inbound edges at step 601. If not all edges have updated (step 602) the node continues to wait.

RR2: After all edges have updated, the node will then sequentially initiate communication with each of its outbound edges, ordered by UID (step 603). If the node has not yet sent messages to all edges (step 604) it continues to send messages.

RR3: Upon completion, it repeats (back to step 601), waiting for all of its inbound edges and so on.

Lemma 3: The above procedure ensures that the Eventual Update Assumption is satisfied.

Proof: We will prove this by contradiction. Suppose there is a a link ij and an interval [t,∞) during which this link does not update. Then, node i must be waiting for one of its inbound edges to be activated, implying the existence of a node k with a UID lower than that of i, which is also waiting for one of its inbound edges to be activated. Repeating this argument, and utilizing the fact that H is acyclic, we can find a path of inactive edges beginning at a root. However, a root has no inbound edges, and hence must initiate communication on all of its outbound edges at some point in [t,∞). This is a contradiction, and proves the desired result, avoiding deadlock.

Joins/Leaves

Peer-to-peer systems constantly deal with dynamic joining and leaving of nodes. Without modification to our averaging protocol, when node i leaves the network (either voluntarily or due to failure), the current value $x_i$ is lost along with the node. As the remaining network continues to operate, the resulting average will be altered.

It is desirable to be able to have the network calculate the average value of the new network (all nodes except for node i). This can be done with the following addition to our protocol:

Suppose each neighbor of node i keeps an additional variable $\delta_i j$ that keeps track of how much net flow (or flux) has taken place on this link since node i joined the network. This value is exactly the effect node i has had on its neighbor node j. When node i leaves the network, each of its neighbor node j can just subtract their $\delta_i j$ from its state $x_i$, therefore compensating the effect of node i. The averaging protocol will then result in the new average (excluding the contribution $z_i$ of node i).

Counting

Due to decentralized design and dynamic joins/leaves, it is often very hard for a peer-to-peer system to estimate the size of the network N (i.e., the total number of active nodes.)

With the help of our averaging protocol, one can obtain a dynamic estimate of N by setting one node state to 1 and the rest to 0. The protocol will drive all states to the average 1/N and therefore each node can figure out what N is by looking at the reciprocal of the average.

One can allocate a special network node for counting purposes. It is also possible to use the bootstrapping nodes that peer-to-peer systems have for this.

Algorithm A2

The blocking behavior described for algorithm A1 may limit the rate at which interactions can occur. As an alternative, we consider algorithm A2. In A2, each node i makes use of the additional variables $\delta_{ij}$ as described above. If there is a link between nodes i and j, there will be variables $\delta_{ij}$ and $\delta_{ji}$ stored locally with node i and node j, respectively.

We will denote the set of all neighbors of node i to be $N_i$. The algorithm A2 is specified mathematically in terms of the $x_i$'s and the $\delta_{ij}$'s as follows in the synchronous environment:

$$\begin{cases} X_i(t+1) = x_i(t) + \gamma_i \left[ \sum_{j \in N_i} \delta_{ij}(t) + z_i - x_i(t) \right] \\ \delta_{ij}(t+1) = \delta_{ij}(t) + \phi_{ij}[x_j(t) - x_i(t)] \end{cases} \quad (15)$$

where we introduce the additional parameters $\phi_{ij}$, which are local step-sizes similar to $\gamma_i$.

Algorithmically, the above update rules require additional specifications. First of all, each $x_i$ is initialized to $z_i$ as in algorithm A1, and each $\delta_{ij}$ is initialized to 0. If there is a link between i and j, the parameters $\phi_{ij}$ and $\phi_{ji}$ are set to be equal. (We will see that one can also just set all $\phi$'s on the network to some constant value.)

Second, in order to guarantee convergence to the correct average, we require the following messaging rules. On each link ij, we impose a sender-receiver relationship on the variables $\phi_{ij}$ and $\phi_{ji}$. One can use UIDs to obtain this, as described above.

MR1: Every node i sends to every neighbor a STATE message that contains its current state value $x_i$ from time to time. Each node also, from time to time, executes the update rule (first equation in (15)) with the information it has about other state values.

MR2: On link ij, if $\phi_{ij}$ is the sender, it executes the update rule (second equation in (15)) from time to time. Whenever $\phi_{ij}$ executes the update rule, it also sends to its receiver $\phi_{ji}$, a REPLY message that contains the value of the change it has made in the value of $\phi_{ij}$. $\phi_{ij}$ will not execute the update rule again until the TCP ACK of this REPLY message comes back.

MR3: If $\phi_{ji}$ is the receiver on link id, it waits for REPLY messages from $\phi_{ij}$ and subtracts the value in the message from the value of $\phi_{ji}$. (Note that the REPLY message does not directly change the value of $x_j$.)

Notice that the second equation in (15) is general enough to cover the execution required in MR3. Also, since the $\phi_{ij}$ variables are employed, A2 is automatically equipped with the ability to handle dynamic topologies. All node i needs to do is to reset $\delta_{ij}$ to 0 if node j leaves the system.

The invention has application in a number of areas. In one embodiment, it is used in ad-hoc sensor networks. Averaging is used to reduce variance in estimates derived from numerous measurements. Another embodiment is distributed load balancing. The system generates an estimate of the average workload in a network that is useful in designing distributed algorithms for task allocation. Another embodiment uses the system as a device for distributed polling. By averaging out the values of many binary "ballots" the members of the network can obtain a distributed estimate of the percentage voting one or zero. Other embodiments include peer-to-peer file sharing networks on the Internet (e.g. BitTorrent, Kazaa, etc.) that can compute application specific averages of interest.

What is claimed is:

1. A method of distributed averaging on a network having a plurality of nodes in excess of two, comprising:
generating a state message at a sending node of the network having a plurality of nodes in excess of two, said state message having a single sending node state value and sending the state message to a receiving node of the network, and only the receiving node;
generating a modified value at the receiving node by multiplying the difference of the single sending node state value and a receiving node state value by a receiving node step-wise value;
updating the receiving node state value using the modified value; and
sending the modified value from the receiving node to the sending node, and only the sending node, in a reply message.

2. The method of claim 1 further including the step of modifying the sending node state value at the sending node by using the returned modified value.

3. The method of claim 2 further including the step of setting a blocking flag at the sending node until the modified value is returned from the receiving node.

4. The method of claim 1 wherein the step of updating the receiving node state value comprises adding the modified value to the receiving node state value.

5. The method of claim 2 wherein the step of updating the sending node state value comprises subtracting the modified value from the sending node state value.

6. The method of claim 1 wherein the stepwise value is a value between 0 and 1.

7. The method of claim 1 wherein the receiving node becomes a sending node after it has received messages from all neighbor sending nodes.

8. The method of claim 1 further including the sending node updating a neighbor variable $\delta$ that accumulates all changes in state made with respect to the receiving node.

9. The method of claim 8 wherein the step of updating the sending node state value uses the neighbor variable $\delta$.

10. The method of claim 8, wherein whenever the receiving node leaves the network, the sending node updates its state value by subtracting the neighbor variable $\delta$.

11. The method of claim 2, wherein the state value of a one of the plurality of nodes is set to 1 and the state values of the rest of the nodes are set to 0, and wherein the steps of, generating a state message at a sending node of the network having a plurality of nodes in excess of two, said state message having a single sending node state value and sending the state message to a receiving node of the network, and only the receiving node, generating a modified value at the receiving node by multiplying the difference of the single sending node state value and a receiving node state value by a receiving node step-wise value, updating the receiving node state value using the modified value, sending the modified value from the receiving node to the sending node, and only the sending node, in a reply message, and modifying the sending node state value at the sending node by using the returned modified value, are repeated for all nodes until the state values of the nodes stabilize at substantially the same value, wherein said same value represents one divided by the number of nodes in the network.

* * * * *